Nov. 10, 1964　　　H. SANDERS　　　3,156,177
FOOD PREHEATING, COOKING AND WARMING DEVICE
Filed July 16, 1962　　　16 Sheets-Sheet 1
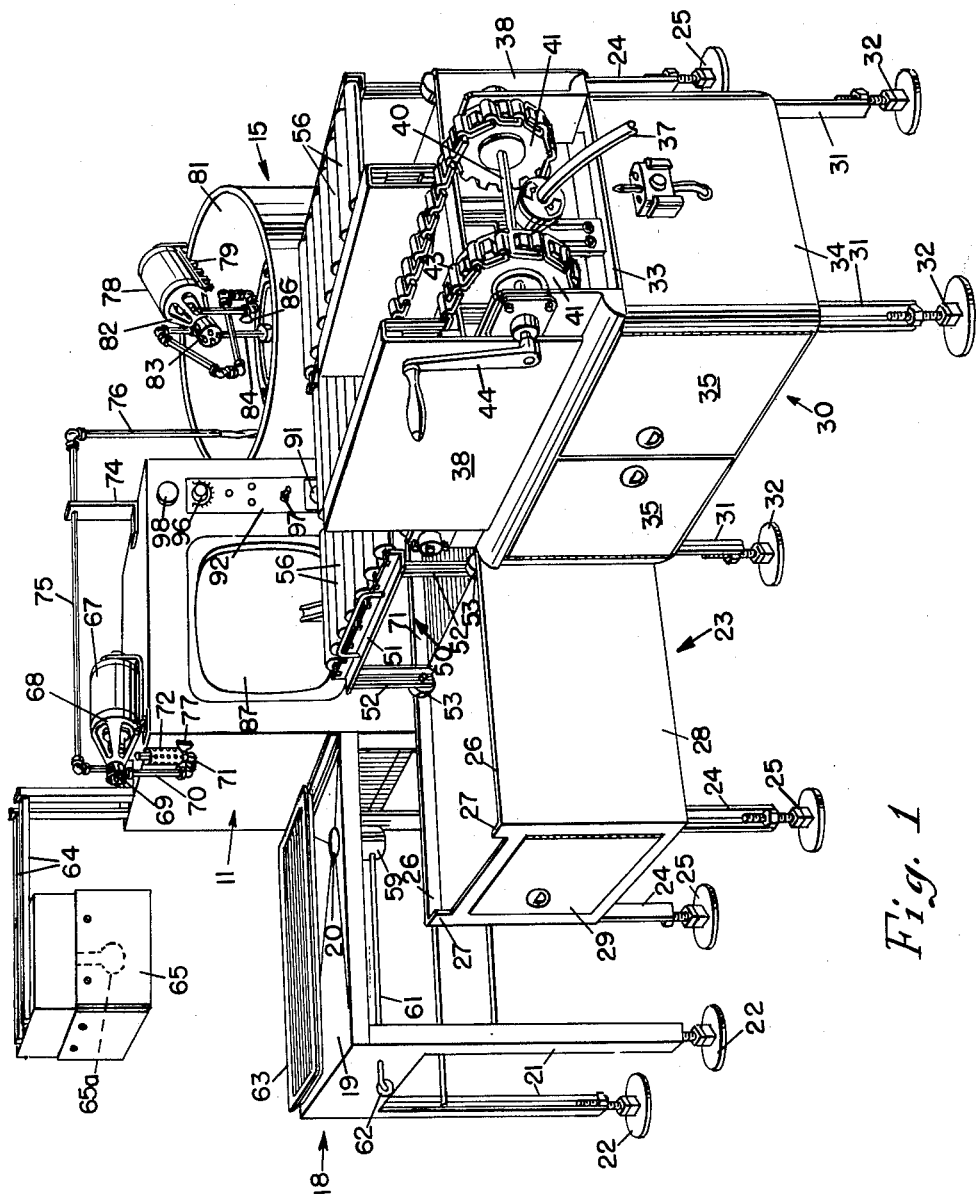
Fig. 1
INVENTOR.
HARLAND SANDERS
BY

Nov. 10, 1964   H. SANDERS   3,156,177
FOOD PREHEATING, COOKING AND WARMING DEVICE
Filed July 16, 1962   16 Sheets-Sheet 3

INVENTOR
HARLAND SANDERS
BY Felix A. Russell
ATTORNEY

Nov. 10, 1964 H. SANDERS 3,156,177
FOOD PREHEATING, COOKING AND WARMING DEVICE
Filed July 16, 1962 16 Sheets-Sheet 4
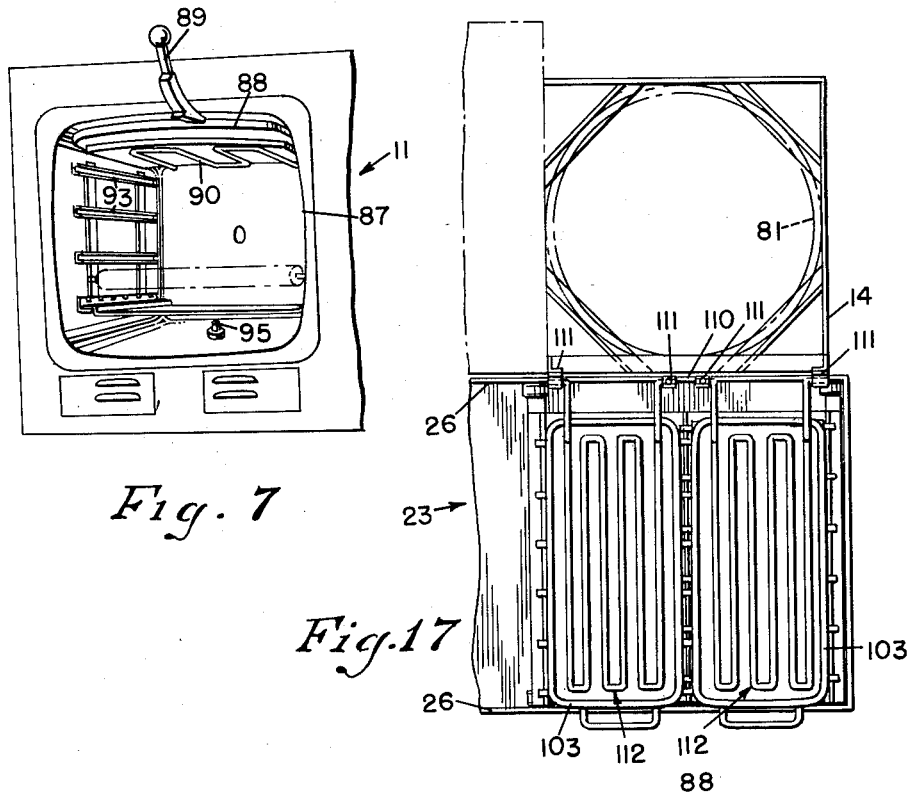
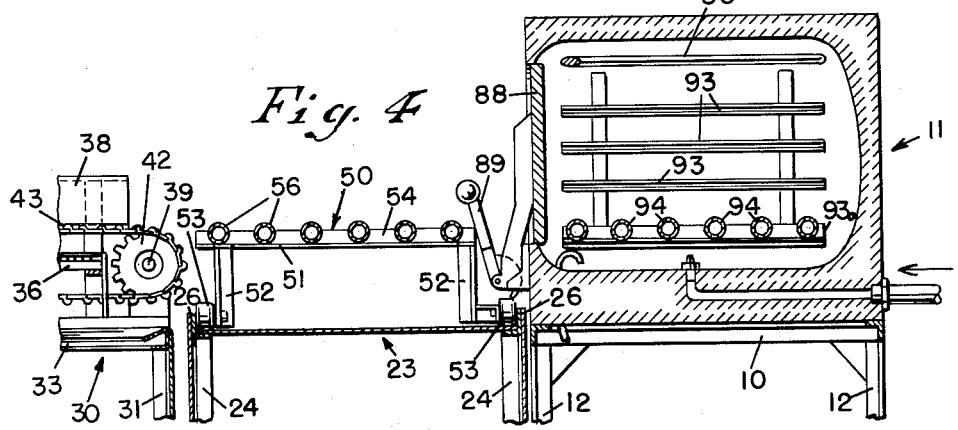
INVENTOR
HARLAND SANDERS
BY *Felix A. Russell*
ATTORNEY

INVENTOR
HARLAND SANDERS

Nov. 10, 1964    H. SANDERS    3,156,177
FOOD PREHEATING, COOKING AND WARMING DEVICE
Filed July 16, 1962    16 Sheets-Sheet 6

INVENTOR
HARLAND SANDERS
BY
ATTORNEY

INVENTOR
HARLAND SANDERS
ATTORNEY

Nov. 10, 1964  H. SANDERS  3,156,177
FOOD PREHEATING, COOKING AND WARMING DEVICE
Filed July 16, 1962  16 Sheets-Sheet 8
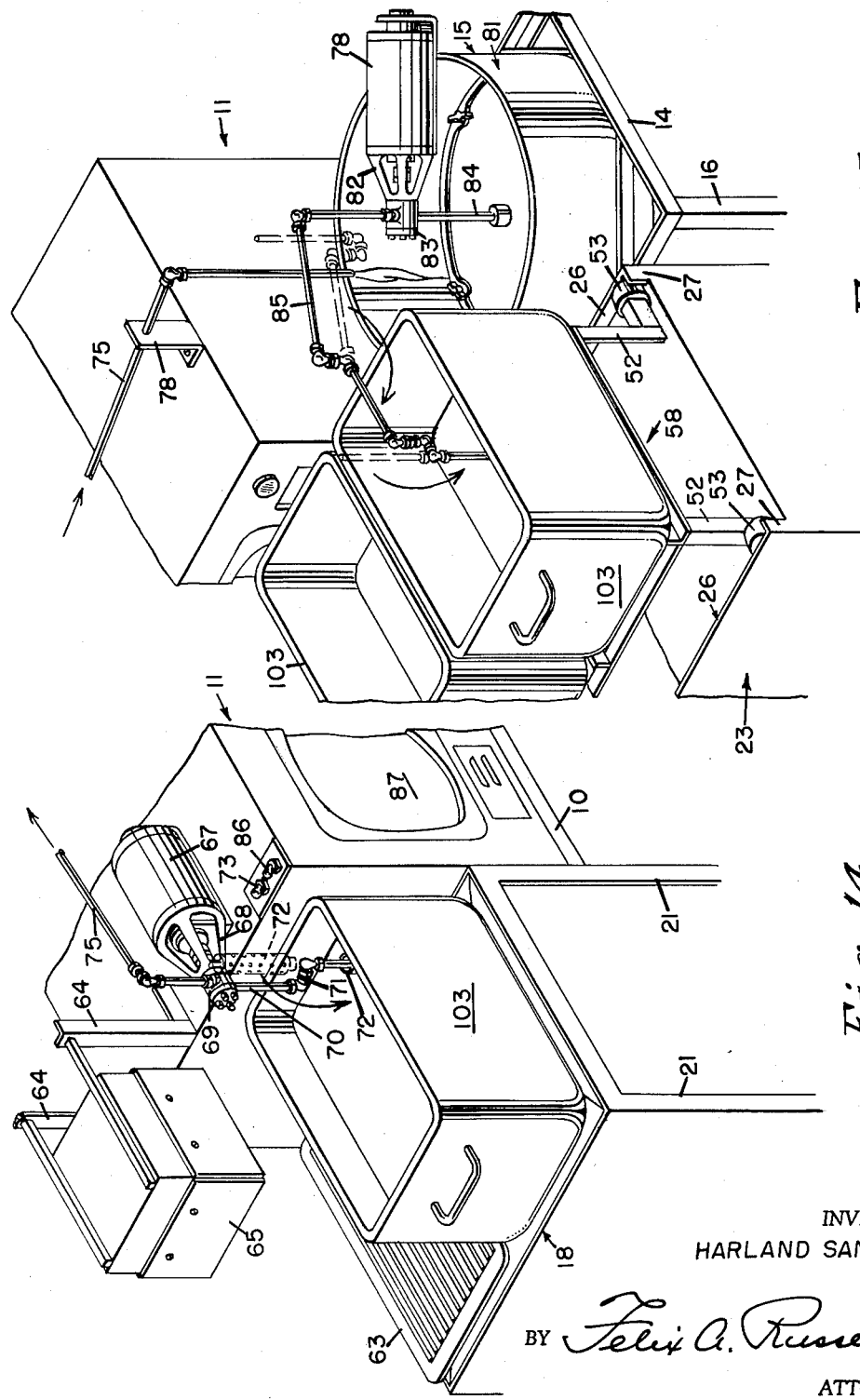
INVENTOR
HARLAND SANDERS
BY Felix A. Russell
ATTORNEY Nov. 10, 1964              H. SANDERS              3,156,177
FOOD PREHEATING, COOKING AND WARMING DEVICE
Filed July 16, 1962              16 Sheets-Sheet 9

INVENTOR
HARLAND SANDERS
BY
ATTORNEY

Nov. 10, 1964  H. SANDERS  3,156,177
FOOD PREHEATING, COOKING AND WARMING DEVICE
Filed July 16, 1962  16 Sheets-Sheet 10
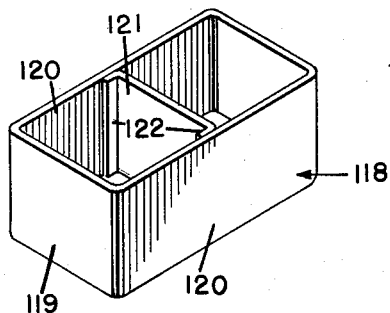
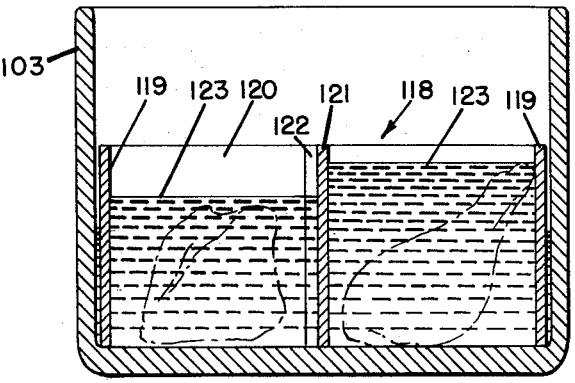
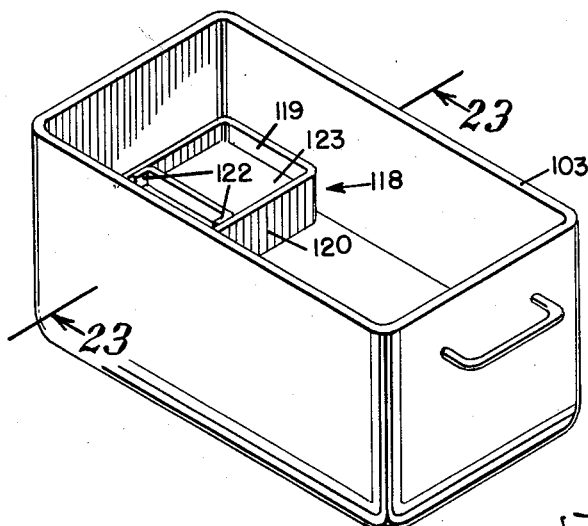
INVENTOR
HARLAND SANDERS
BY
ATTORNEY Nov. 10, 1964  H. SANDERS  3,156,177
FOOD PREHEATING, COOKING AND WARMING DEVICE
Filed July 16, 1962  16 Sheets-Sheet 11

INVENTOR
HARLAND SANDERS

BY
ATTORNEY

Nov. 10, 1964   H. SANDERS   3,156,177
FOOD PREHEATING, COOKING AND WARMING DEVICE
Filed July 16, 1962   16 Sheets-Sheet 13

INVENTOR
HARLAND SANDERS

BY *Felix A. Russell*

ATTORNEY

Nov. 10, 1964     H. SANDERS     3,156,177
FOOD PREHEATING, COOKING AND WARMING DEVICE
Filed July 16, 1962     16 Sheets-Sheet 15

INVENTOR
*HARLAND SANDERS*
BY *Felix A. Russell*
ATTORNEY

United States Patent Office 3,156,177
Patented Nov. 10, 1964

3,156,177
FOOD PREHEATING, COOKING AND
WARMING DEVICE
Harland Sanders, Shelbyville, Ky., assignor, by mesne assignments, to Kentucky Fried Chicken Corporation, Shelbyville, Ky., a corporation of Kentucky
Filed July 16, 1962, Ser. No. 209,935
9 Claims. (Cl. 99—339)

The present invention relates to a cooking apparatus and it consists in the combinations, constructions and arrangements of parts herein described and claimed.

Generally there is provided a compact apparatus particularly adaptable for the rapid cooking of chicken under pressure but also capable of cooking, with or without pressure, many other types of food. In the apparatus there is provided an oven having a door which may be quickly opened and closed. An elongated transfer table is positioned in front of and extends transversely with respect to the oven door. A preheating table is positioned opposite the oven at the other side of the transfer table. At one side of the oven there is provided a filter for cooking oil or fat while at the other side of the oven there is provided a warming table. A series of pan supports is provided with wheel equipped legs whereby the supports may be easily moved longitudinally along the transfer table and each is provided with a plurality of rollers extending in a direction parallel to the longitudinal axis of the transfer table. The preheating table is equipped with novel means for preheating the contents of a cooking pan placed thereon. Gas may be utilized for this purpose or, in an alternative arrangement, the pans are equipped with built-in electrical heating coils and may be readily plugged into a source of electrical energy when placed upon the preheating table. Manually or power operated means are provided in the preheating table for moving a preheated pan across the rollers of one of the pan supports which has previously been aligned therewith and onto a series of roller supports mounted in the lower portion of the aforesaid oven. Novel means is provided for pumping filtered oil or fat from the filter to a pan positioned upon an adjacent pan support on the transfer table prior to its being moved along the transfer table to a position where it may be rolled on to the preheating table. The warming table is adapted to receive a pan of cooked food from the oven, utilizing for such purpose the aforesaid pan supports and is equipped with infra red means for maintaining the contents of such pan at a proper temperature previous to serving. A novel pumping arrangement is provided for removing the liquid cooking ingredient from a pan upon the warming table to deliver the same to the aforementioned filter. Novel means is provided in association with the oven for producing predetermined pressure within the oven during the cooking process therein.

In a modified form of the invention the transfer table is provided with a multiplicity of balls freely mounted thereon in spaced relation to one another, the balls lying in a horizontal plane whereby cooking pans may be supported thereby and easily moved from one position to another thereon thus dispensing with the need for the wheeled pan supports.

In a further modified form of the invention, additional preheating tables are provided in side-by-side relationship to the previously mentioned preheating table. In this form of the invention a plurality of pans may be preheated either simultaneously or at the required convenience of the operator and then manipulated upon the transfer table at will for further operations in the apparatus.

In a still further form of the invention there is provided a circular revolving preheating table having a plurality of radially extending preheating stations each equipped with either manually or motor operated means for delivering a pan therefrom directly to the oven. In this form of the invention the transfer table is not necessary as pans removed from the oven may be moved directly to the warming table. Also, in this form of the invention, novel mechanical means is provided for revolving the circular table intermittently for a portion of its circumferential movement with further means provided for registering the preheating station with the oven when the circular table is at rest.

It is accordingly an object of the invention to provide an apparatus of the character set forth which is simple in construction, relatively inexpensive to manufacture and yet one which is effective and efficient in use.

Another object of the invention is to provide an apparatus of the character set forth which is capable of performing its various functions under the control of a single operator.

A further object of the invention is to provide, in an apparatus of the character set forth, an oven having novel roller supports mounted therein.

Another object of the invention is to provide, in an apparatus of the character set forth, novel transfer tables forming parts of the invention.

Still another object of the invention is to provide, in an apparatus of the character set forth, a novel pan structure forming a part of the invention.

A still further object of the invention is to provide, in an apparatus of the character set forth, a novel preheating table having mechanical means for moving pans thereon and therefrom.

Another object of the invention is to provide, in an apparatus of the character set forth, a novel preheating table having a plurality of preheating stations and novel means for intermittently and partially rotating the same, said table and said means forming parts of the invention.

A further object of the invention is to provide, in an apparatus of the character set forth, an elongated transfer table and a plurality of laterally extending aligned preheating tables each provided with mechanical means for transferring pans to and from said table, said preheating tables and said means both forming parts of the invention.

Still another object of the invention is to provide, in an apparatus of the character set forth, novel inserts for cooking pans forming a part of the invention, said inserts providing means for cooking relatively smaller portions of food than would normally be handled by said pan.

A further object of the invention is to provide, in an apparatus of the character set forth, a novel pivotally mounted electrical heating unit forming a part of the invention and having novel means whereby it may be submerged in or removed from the liquid cooking ingredient in a cooking pan.

Another object of the invention is to provide, in an apparatus of the character set forth, a novel articulated delivery pipe for delivering filtered liquid cooking ingredient from a filter to a cooking pan, said pipe forming a part of the invention.

Other and further objects of the invention will become apparent from a reading of the following specification taken in conjunction with the drawings, in which:

FIGURE 1 is a perspective view of one embodiment of the invention,

Figure 2:
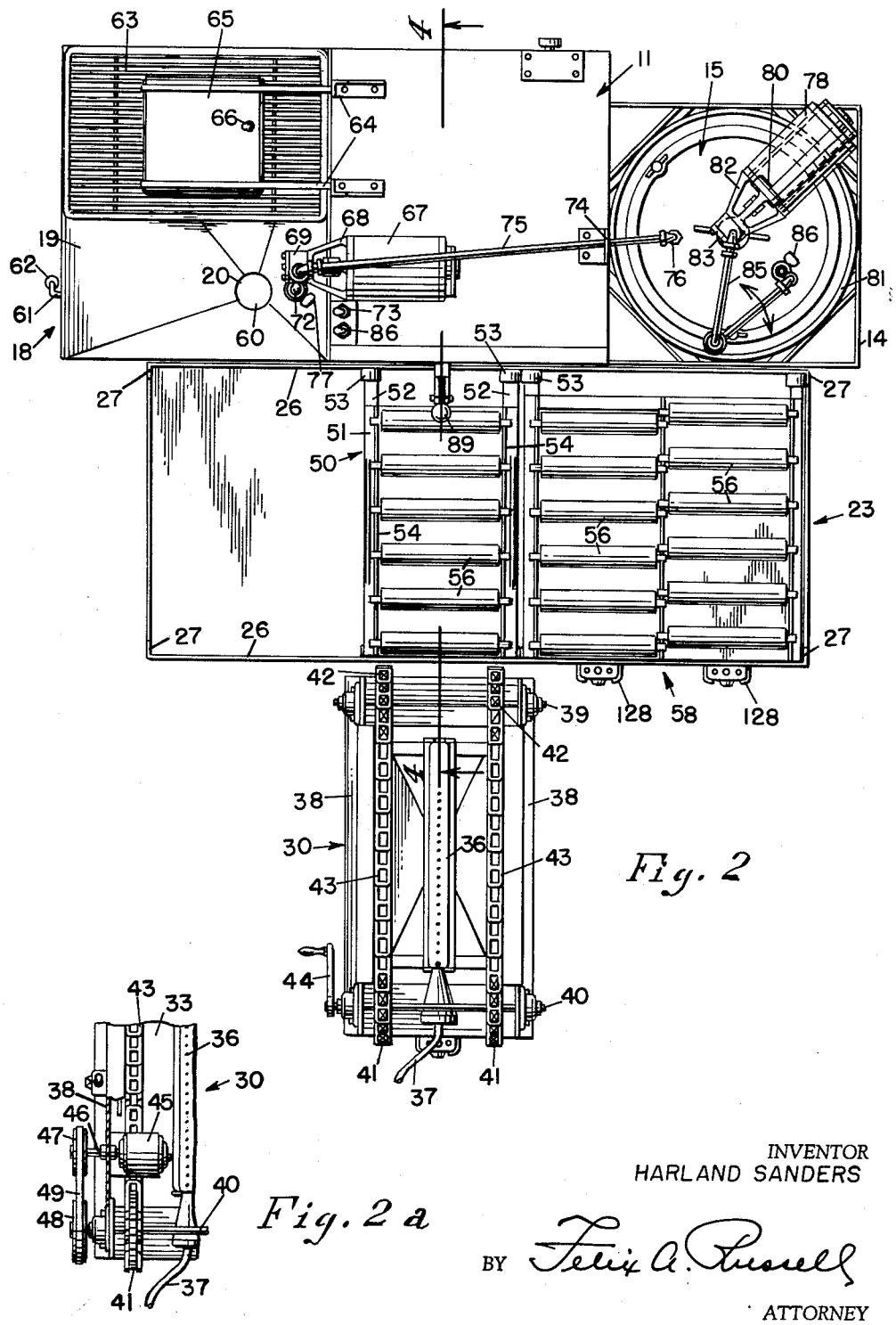
FIGURE 2 is a plan view of the apparatus illustrated in FIGURE 1.
Figure 3:
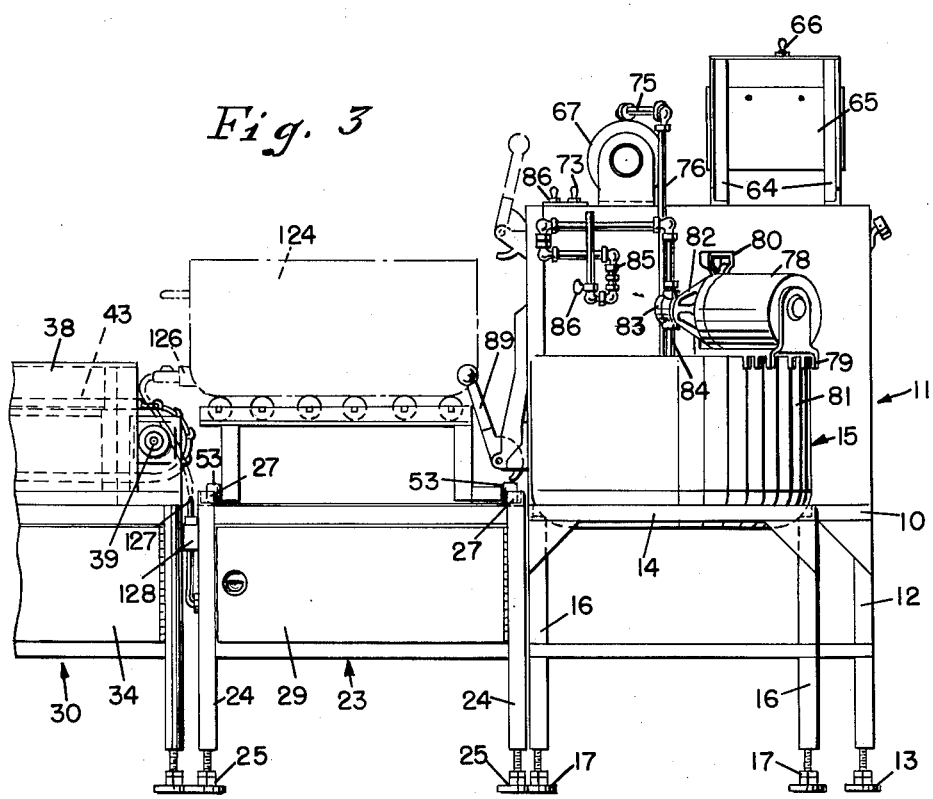
Figure 16:
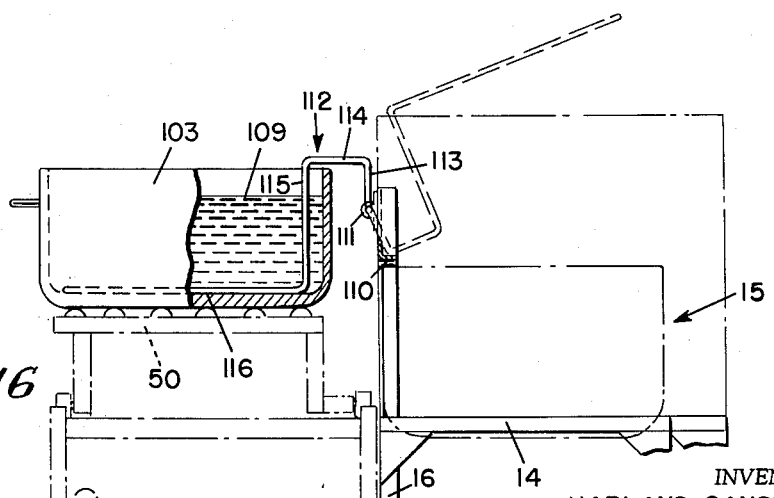
Figure 5:
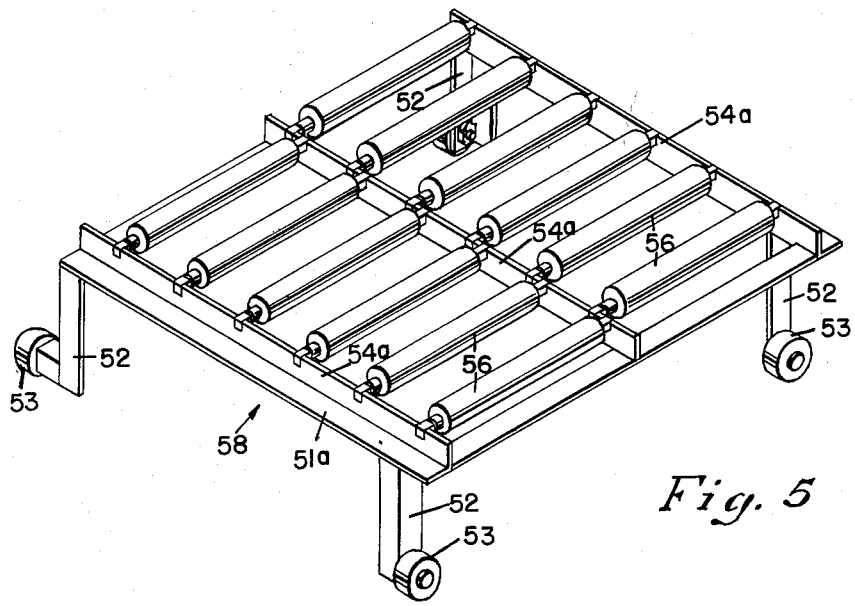
Figure 6:
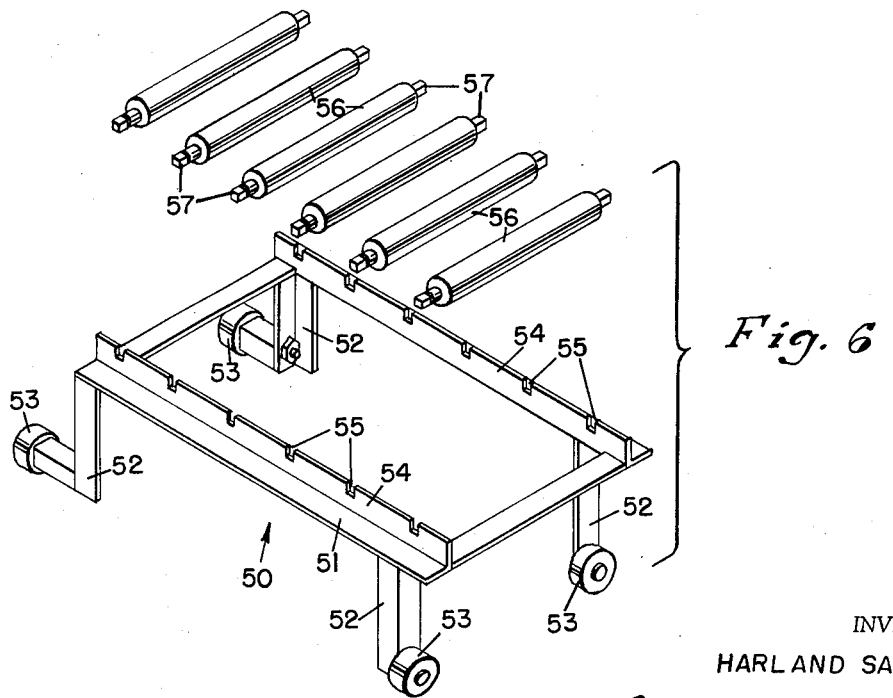
Figure 8:
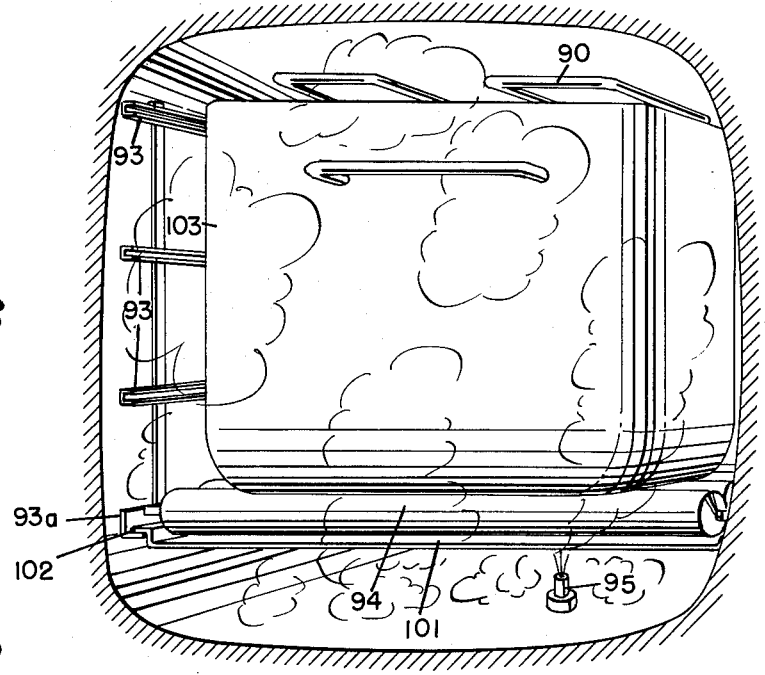
Figure 9:
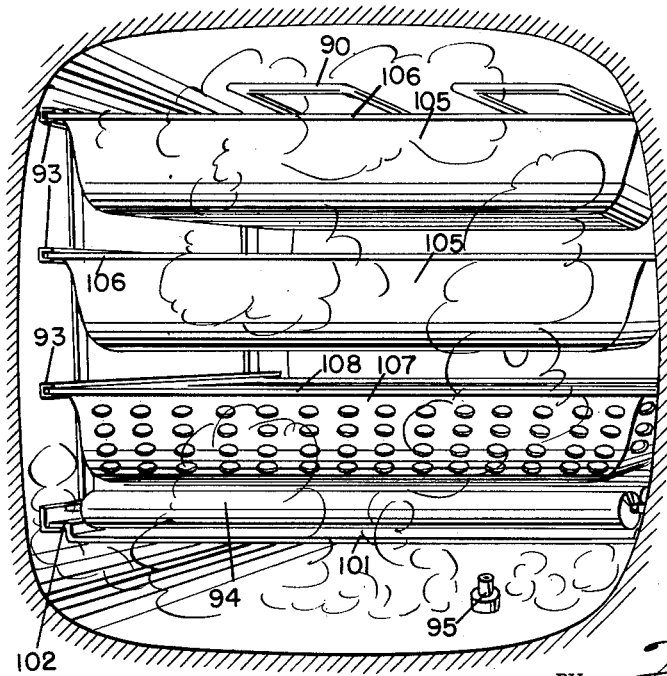
Figure 10:
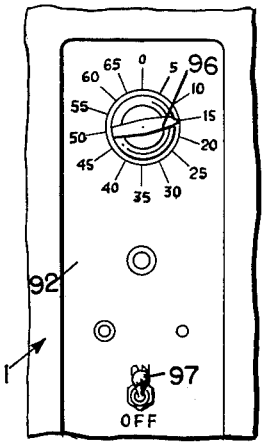
Figure 11:
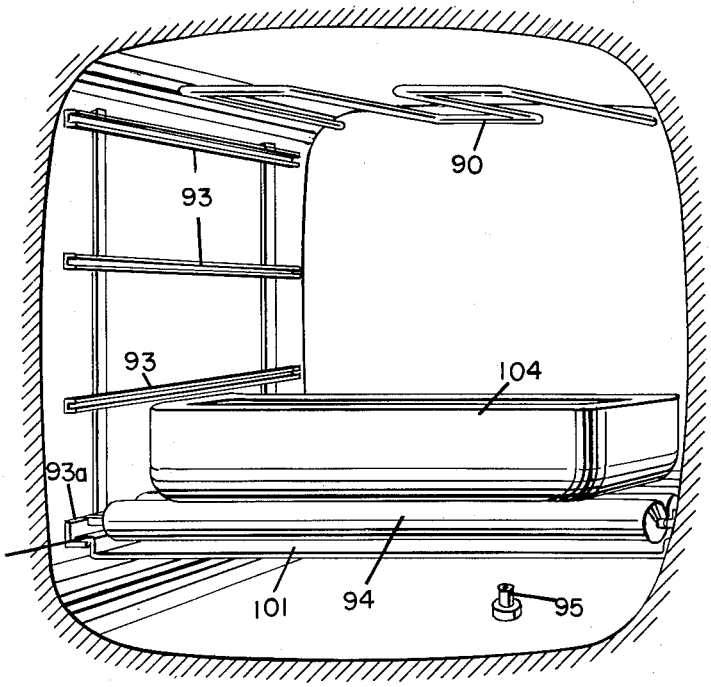
Figure 12:
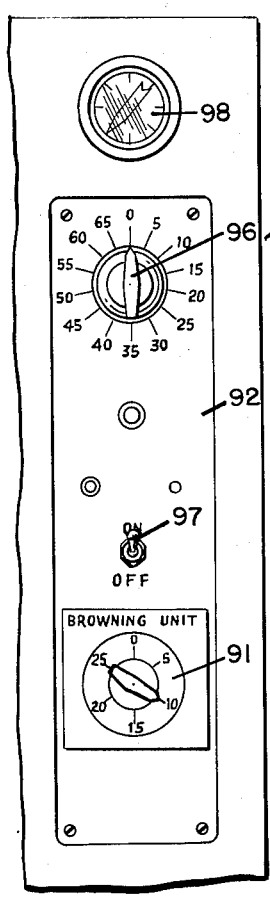
Figure 13:
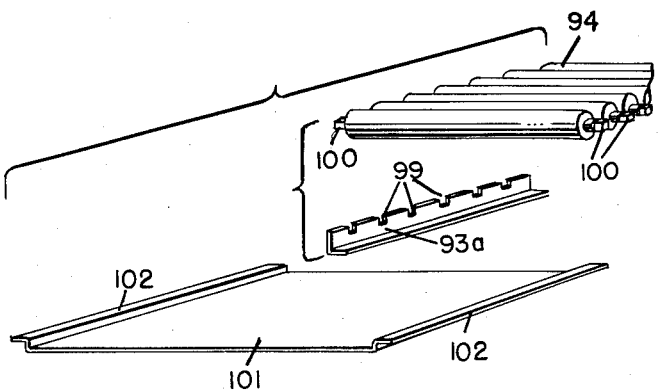
Figure 18:
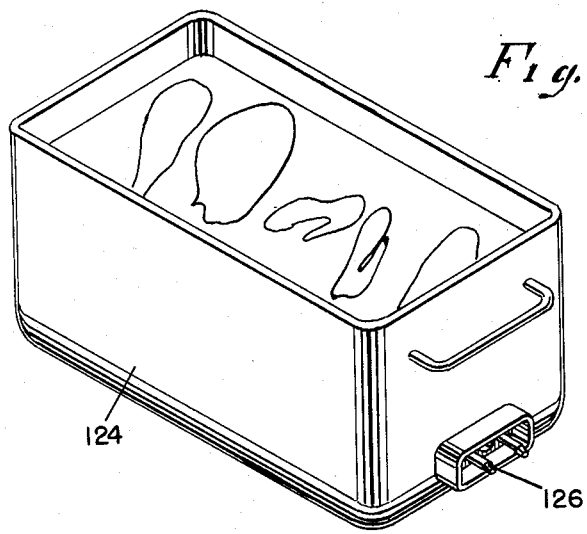
Figure 19:
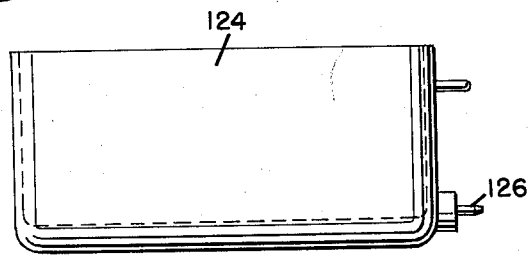
Figure 20:
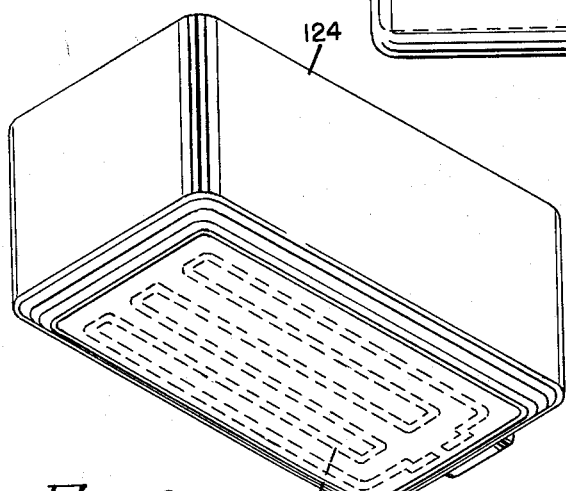
Figure 24:
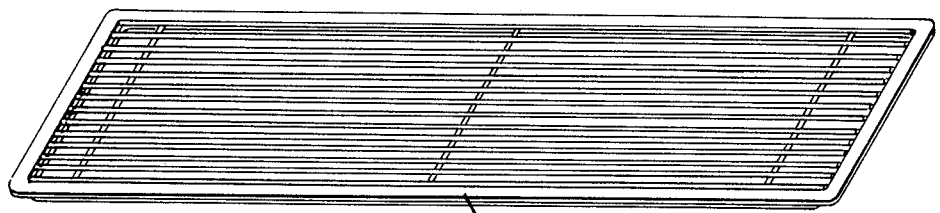
Figure 25:
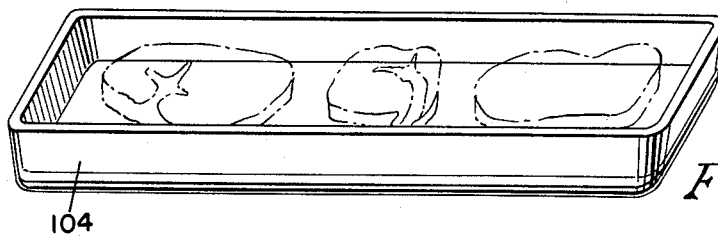
Figure 26:
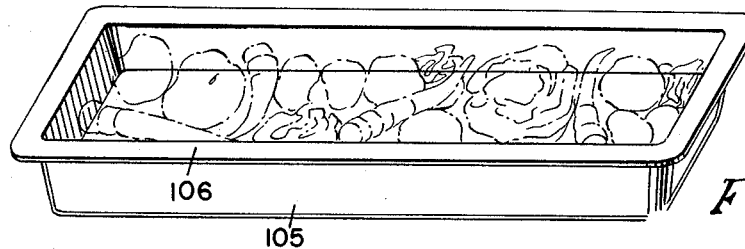
Figure 27:
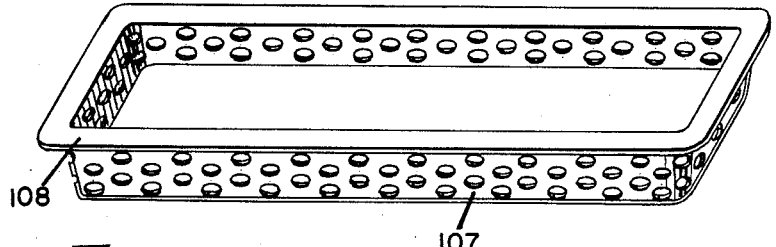
Figure 28:
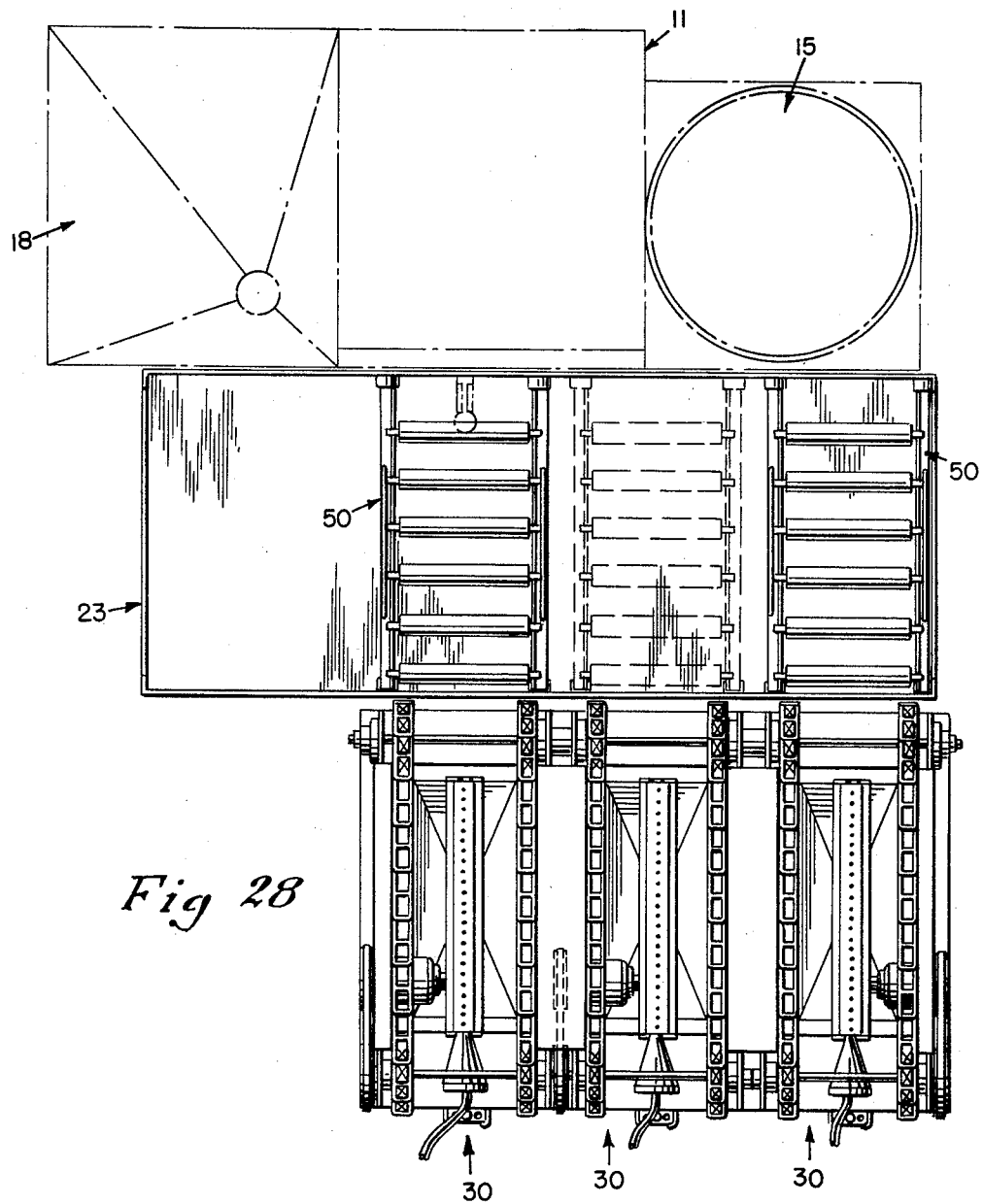
Figure 29:
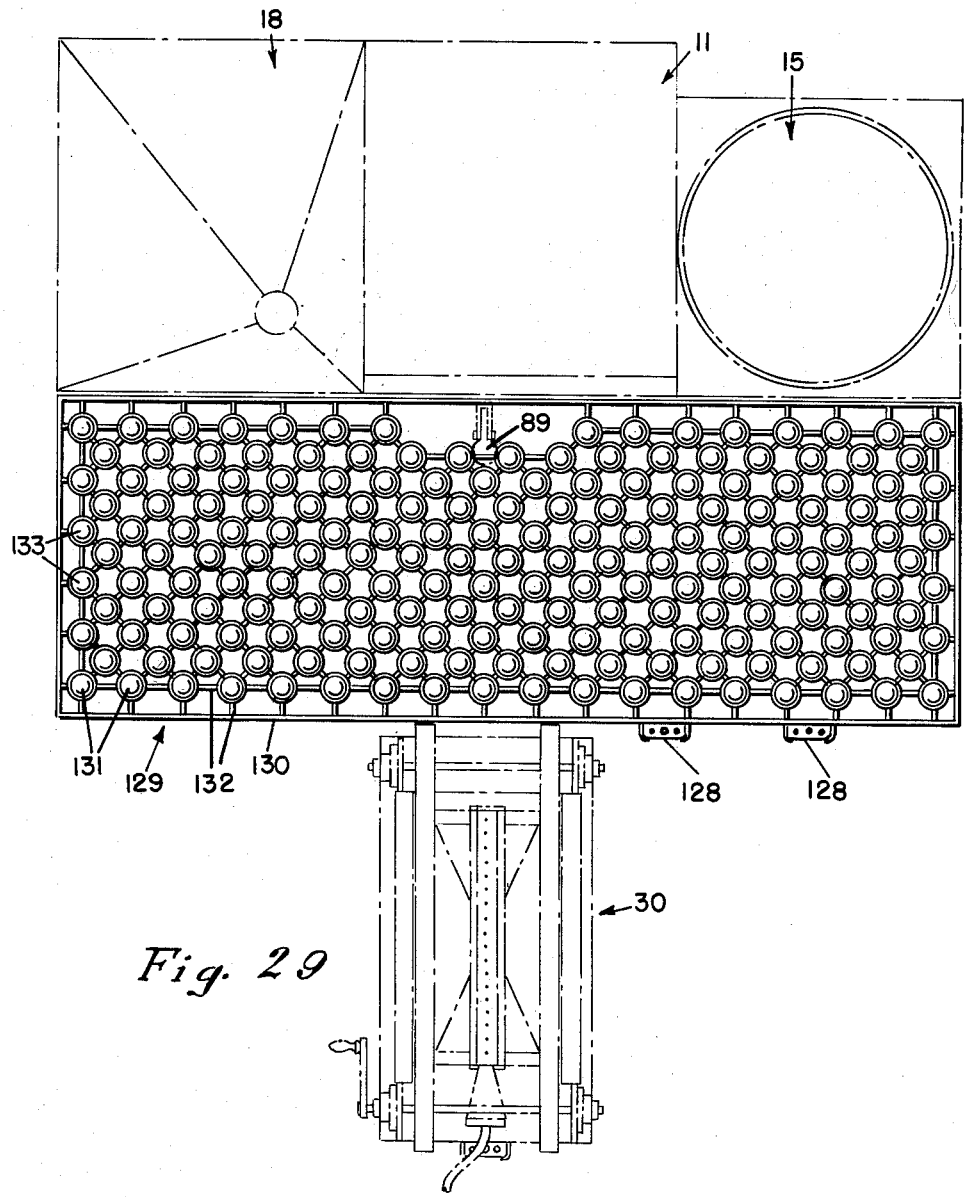
Figure 30:
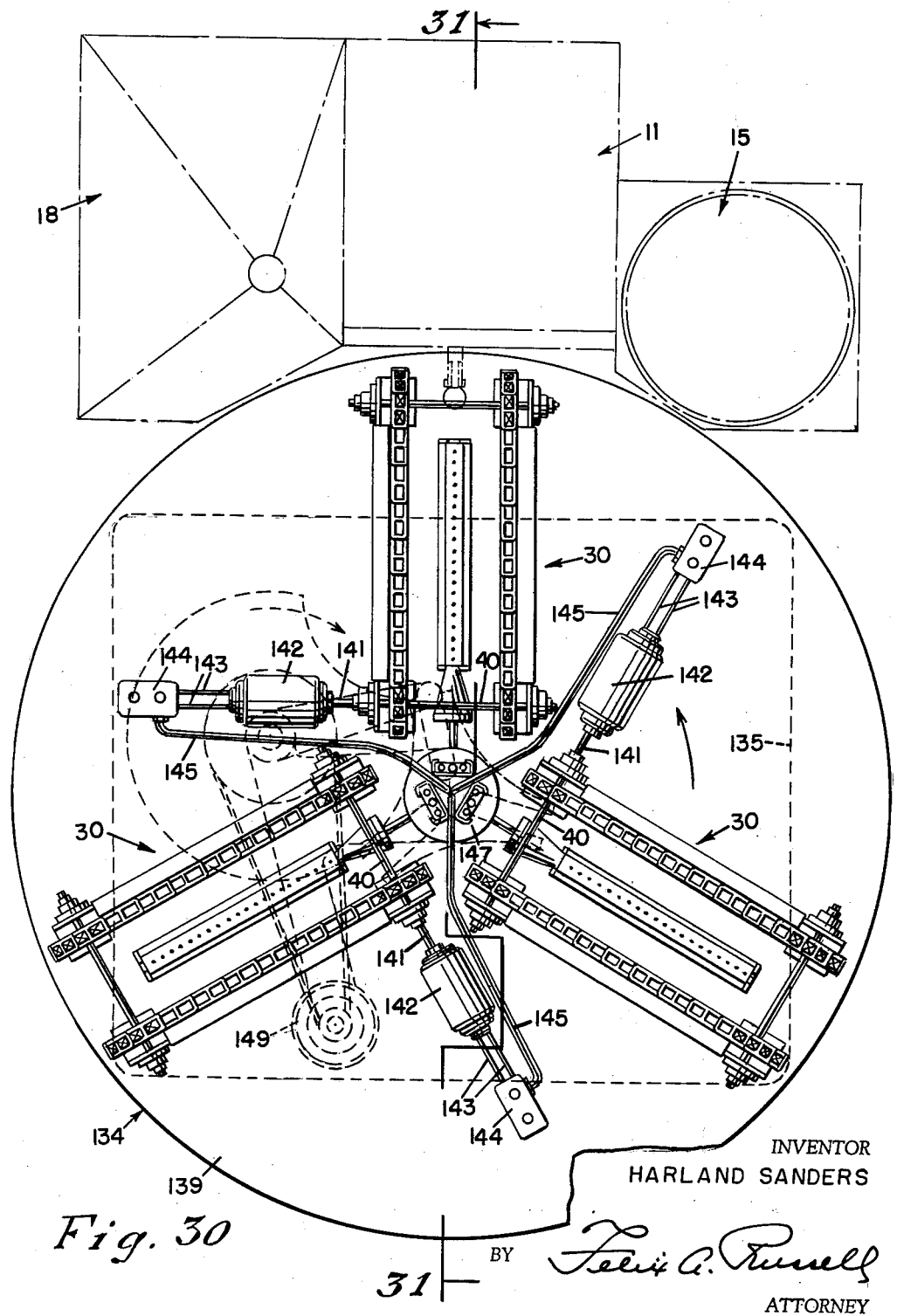
Figure 31:
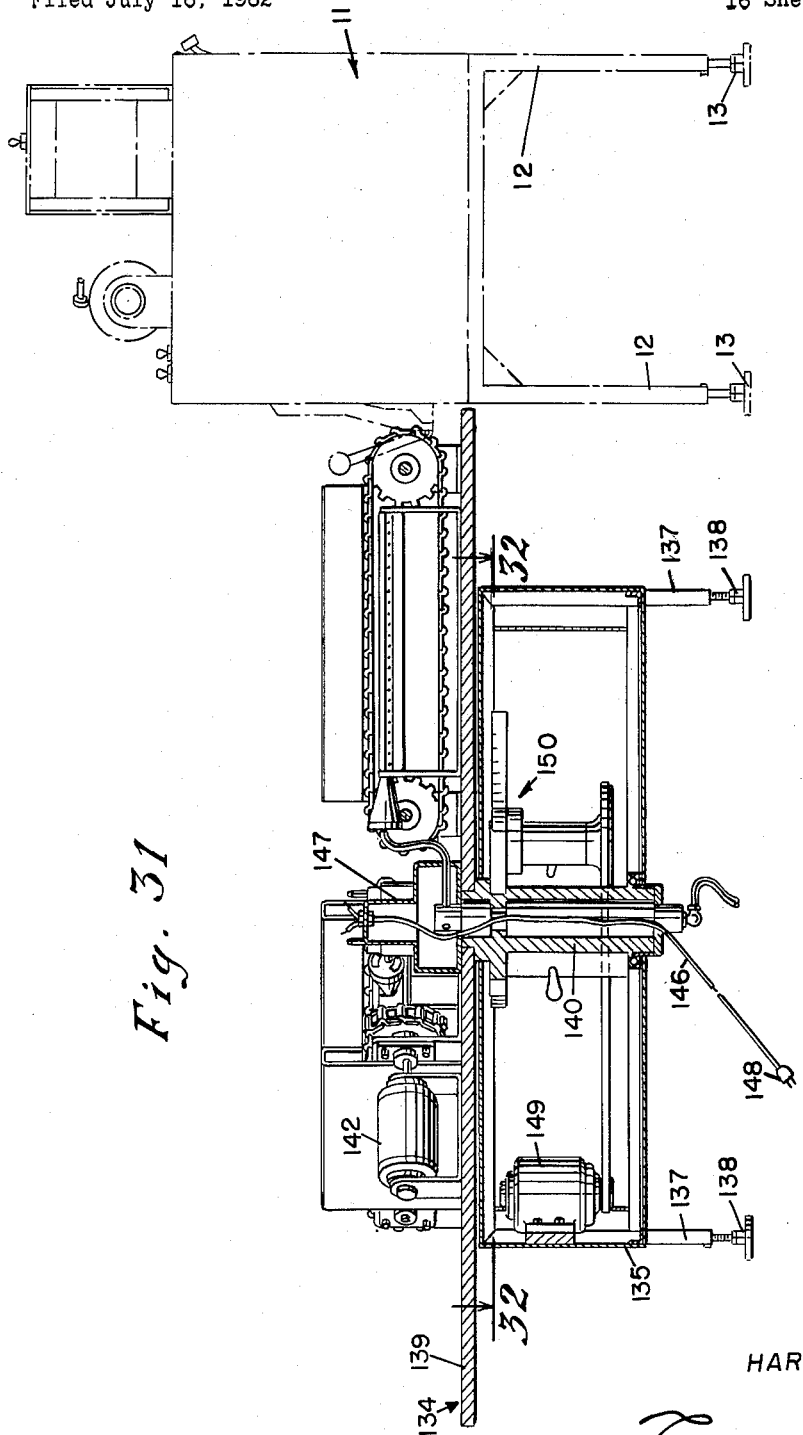
Figure 32:
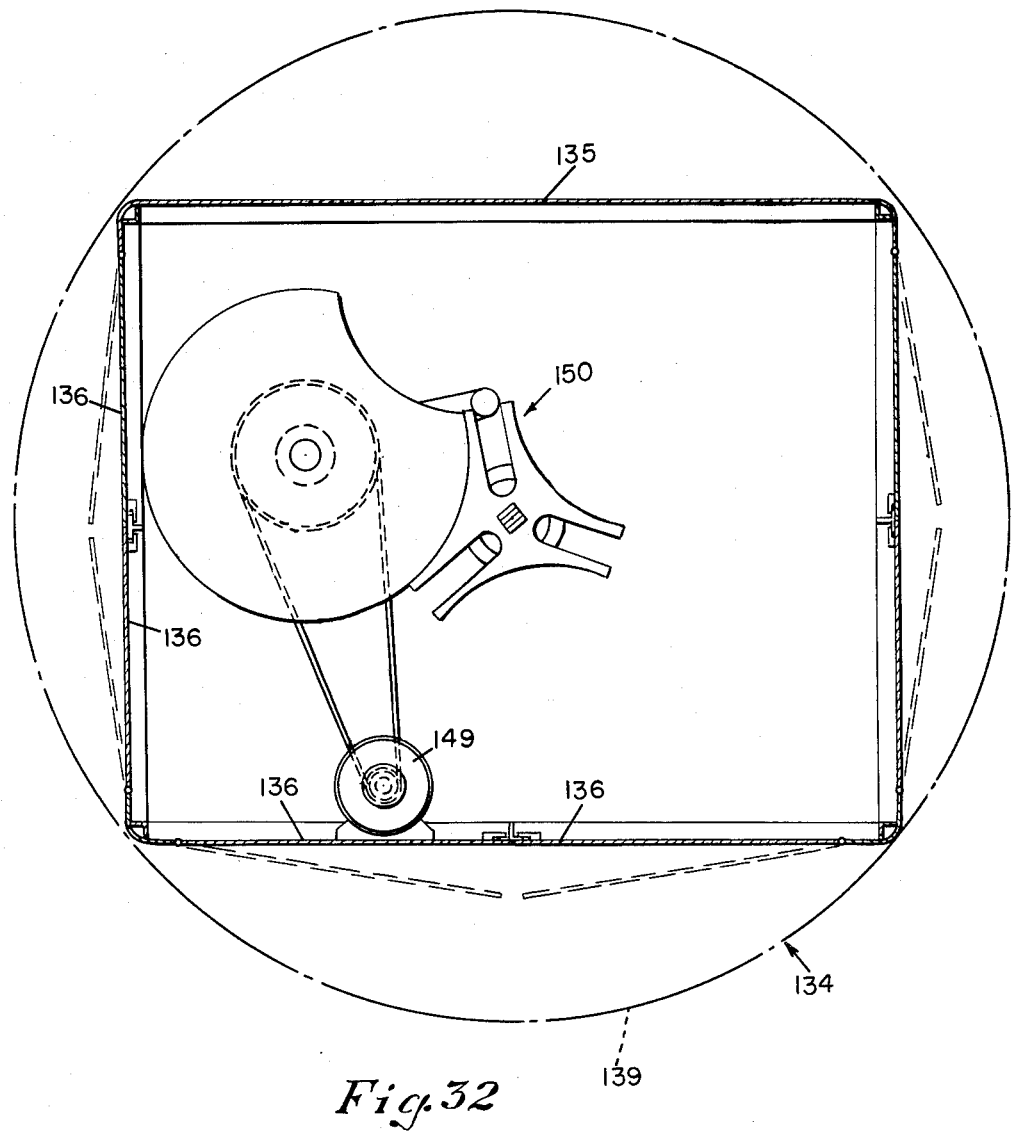

FIGURE 2a is a fragmentary plan view similar to FIGURE 2 but illustrating a modified driving means for a heating table shown therein, FIGURE 3 is a side elevational view of the apparatus shown in FIGURE 1 taken from the right side of FIGURE 1, FIGURE 4 is a fragmentary sectional view taken substantially along line 4—4 of FIGURE 2, FIGURE 5 is a perspective view of a cooking pan support shown in FIGURES 1 and 2 but illustrating the same in greater detail, FIGURE 6 is an exploded perspective view of the device illustrated in FIGURE 5, FIGURE 7 is a fragmentary perspective view of an oven forming a part of the invention and showing the door thereof in opened condition, FIGURE 8 is a fragmentary perspective view of the oven above referred to illustrating a relatively large cooking pan supported on rollers mounted therein, FIGURE 9 is a view similar to FIGURE 8 but showing a plurality of relatively smaller cooking pans supported by racks mounted in said oven, FIGURE 10 is a fragmentary elevational view illustrating a steam pressure control panel forming a part of the oven structure, FIGURE 11 is a view similar to FIGURES 8 and 9 but illustrating a relatively small pan supported on the rollers in such manner that the contents thereof may be broiled in the oven by means of an electrical broiling element shown therein, FIGURE 12 is a fragmentary elevational view illustrating the complete control panel for the operation of the oven, FIGURE 13 is an exploded perspective view illustrating a diffuser plate, roller support and rollers all mounted in the lower portion of the oven, FIGURE 14 is a fragmentary perspective view illustrating a warming table and associated apparatus forming parts of the invention, FIGURE 15 is a fragmentary perspective view illustrating a filter and associated mechanisms forming parts of the invention, FIGURE 16 is a fragmentary elevational view, partly in section and partly schematic, illustrating a hinged electrical heating element forming an alternative part of the invention, FIGURE 17 is a fragmentary plan view of FIGURE 16, FIGURE 18 is a top perspective view of a cooking pan having a self-contained electrical heating element embedded therein, FIGURE 19 is a side elevational view thereof, FIGURE 20 is a bottom perspective view of the pan illustrated in FIGURES 17 and 18, FIGURE 21 is a perspective view similar to that shown in FIGURES 18 to 20, inclusive, with or without an embedded heating element, and showing a novel insert for cooking smaller portions of food than would normally be placed in said pan, FIGURE 22 is a perspective view of said insert, FIGURE 23 is a sectional view taken along line 23—23 of FIGURE 20, FIGURE 24 is a perspective view of a grill forming a part of the invention, FIGURE 25 is a perspective view of a broiling pan forming a part of the invention, FIGURE 26 is a perspective view of a vegetable pan utilized in the invention, FIGURE 27 is a perspective view of a perforated steaming pan utilized in the invention, FIGURE 28 is a plan view, partly schematic, of a modification of the apparatus shown, for example, in FIGURES 1 and 2, FIGURE 29 is a plan view, partly schematic, of another modification of the invention shown, for example, in FIGURES 1 and 2 and illustrating a modified form of transfer table, FIGURE 30 is a view similar to FIGURES 28 and 29 but illustrating a still further modification of the invention, particularly showing an intermittently rotating table forming a part of the invention, FIGURE 31 is a sectional view taken substantially along line 31—31 of FIGURE 30, and FIGURE 32 is a sectional view taken substantially along line 32—32 of FIGURE 31.

Referring more particularly to the drawings, there is shown therein, in FIGURES 1 to 12, inclusive, one form of the invention comprising a centrally disposed oven table 10 upon which is supported an oven generally indicated at 11, the table 10 being provided with legs 12 and vertically adjustable feet 13.

At one side of the table and preferably secured thereto in any suitable manner is a filter table 14 upon which is mounted a filter generally indicated at 15, the table 14 being provided with legs 16 and vertically adjustable feet 17.

At the other side of the oven table 10 and preferably secured thereto in any suitable manner is a warming table generally designated at 18 having a top 19 which slopes toward a drain opening 20 and provided with legs 21 having vertically adjustable feet 22.

A rectangular transfer table is generally designated at 23 and extends in parallel relation to the assembled tables 10, 14 and 18 and preferably secured to such tables in any suitable manner whereby to provide rigidity to the apparatus as a whole. The table 23 is provided with supporting legs 24 and vertically adjustable feet 25. The upper longitudinal edges of the table 23 are provided with upwardly extending guide rails 26 terminating at each of their ends in integrally formed inwardly directed stop members 27. The central portion of the transfer table 23 is taken up with a storage cabinet 28 having access doors 29.

A preheating table is generally designated at 30 and is positioned adjacent to the transfer table 23 directly opposite the oven 11 and is likewise preferably secured to the transfer table in any suitable manner in the interests of stability. The table 30 is provided with supporting legs 31, vertically adjustable feet 32 and a top 33. Below the top 33 is a storage cabinet 34 provided with access doors 35. The table 30 is rectangular and its principle axis extends in a direction toward the oven 11.

Centrally mounted atop the table 30 is a longitudinally extending gas burner 36 having a gas fuel feed pipe 37 suitably connected thereto at its outer end and extending to a source (not shown) of gaseous fuel.

The table 30 is provided with a pair of upright spaced longitudinally extending walls 38 between which is mounted an inner transverse shaft 39 and an outer transversely extending drive shaft 40. The shaft 40 has affixed thereto a pair of spaced drive sprockets 41 and the shaft 39 has affixed thereto a pair of driven sprockets 42. A pair of endless chains 43 are entrained over the sprockets 41 and 42. An operating handle 44 is provided at one end of the shaft 40 exteriorly of the adjoining wall 38. Alternatively, as shown in FIGURE 2a, instead of the manually operable handle 44, a motor 45 is mounted on the top 33 and is provided with a drive shaft 46 extending through the adjacent wall 38 in parallel relation to the shaft 40. A pulley 47 is affixed to the outer end of the shaft 46 while a pulley 48 is affixed to the adjacent outer end of the shaft 40 and a belt 49 interconnects the pulleys 47 and 48.

A transfer rack is generally indicated at 50 and is shown in detail in FIGURE 6. The rack 50 consists of a rectangular frame 51 which extends transversely of the transfer table 23 and is provided with dependent legs 52 each provided at its lower end with a roller 53 preferably formed of a plastic material requiring little or no lubrication. The axes of the rollers 53 extend transversely with respect to the transfer table 23 so that the rack 50 is permitted to move longitudinally of the table 23, the rollers being guided by and confined within the guides 26 and movement beyond the table 23 is prevented by the stop members 27. The frame 51 is provided at either side with an upwardly extending foreshortened wall 54 each of which is provided in its upper edge portion with a series of spaced squared notches 55. A plurality of supporting rollers 56 is rotatably mounted on shafts having square ends 57, the ends 57 each being receivable in one of the notches 55.

In FIGURES 2 and 5, there is shown an alternative form of transfer rack, generally indicated at 58. In this form, the structure is identical with that of the rack 50 except that there is provided with three foreshortened walls 54a, the outer two of which are provided with squared notches for receiving the outer squared ends 57 of two rows of rollers 56 while the center wall 54a is provided with double the number of notches to receive the inner ends 57 of the roller shafts.

Referring now to the warming table 18, it will be seen that a pipe 59 extends downwardly from the drain opening 20 (see FIGURE 1) and that a valve 60 (see FIGURE 2) is mounted therein upon a shaft 61 which extends therethrough and through one side of the table 18 to terminate in an operating handle 62.

On the rear portion of the top 19 of the table 18 there is mounted a gridlike drain 63 and to the adjacent top side of the oven 11 there is affixed a pair of brackets 64 which extend upwardly and outwardly to support a lamp housing 65 directly over the drain 63. A switch 66 for controlling an infrared lamp, as indicated in dotted lines at 65a, within the housing 65 is mounted atop said housing.

An electric motor 67 is mounted on the top of the oven 11 adjacent the forward end thereof on that side thereof adjacent the warming table 18 and is provided at its outer end which overhangs the table 18 with a bracket 68 supporting a pump 69 which is operated by said motor. An inlet pipe 70 depends from the pump 69 and terminates in a hinged coupling 71 to which is affixed a screened suction pipe 72. A switch 73 is mounted on the top of the oven 11 for controlling the motor 67.

Extending from the pump 69 upwardly and across the top of the oven 11 and supported by a bracket 74 fixed to the top of the oven at that side thereof adjacent the filter table 14 is a pipe 75 which terminates in a downwardly directed discharge pipe 76 which discharges into the filter 15. A valve 77 is provided for the suction pipe 72.

An electric motor 78 is removably mounted by means of feet 79 and handle 80 on the rim of a tank 81 forming part of the filter 15 and is provided with a bracket 82 supporting a pump 83 driven by the motor 78. A suction pipe 84 extends downwardly from the pump 83 to connect with the filter 15 in the tank 81 and an articulated discharge pipe 85 extends from the upper side of the pump 83 and is adapted to be extended from a position over the tank 81, as shown in dotted lines in FIGURE 15, to a position above one end portion of the transfer table 23, as shown in full lines in FIGURE 15. A switch 86 is mounted on the oven 11 adjacent the switch 73 and controls the motor 78.

Referring now to the oven 11, it will be seen that it is provided with an opening 87 having a door 88 provided with a dogging handle 89 and it will be apparent by referring to FIGURES 4 and 7 that in its open position the door will take a horizontal position beneath the top of the oven 11 while in its closed position it will abut the inner peripheral edge portions of the opening 87 and may be locked in sealed condition in such position by the camming or dogging action of the handle 89.

Adjacent the top of the oven 11 there is mounted a horizontally extending electrical heating unit 90 controlled by a rheostatic switch 91 in a panel 92 affixed to the front wall of the oven 11. Each of the side walls of the oven is provided with racks 93 and in the lower end portion of the oven there is mounted a series of horizontally aligned transversely extending rollers 94. A steam inlet nozzle 95 is centrally located in the bottom wall of the oven 11.

A pressure control switch 96 is mounted on the panel 92 and is adapted to control steam pressure within the oven 11 when the door 88 is dogged in closed position, as shown in FIGURE 4, the steam emanating through the nozzle 95 from a source (not shown) within the oven structure 11. A master electrical switch 97 is provided on the panel 92 for controlling the supply of electrical current to the heating unit 90 and for the heat supply (likewise not shown) for the aforesaid steam source. A gauge 98 is mounted on the oven 11 above the panel 92 for determining the pressure within the oven at any given moment.

Referring to FIGURE 13 it will be seen that the lowermost of the racks 93, designated at 93a, are provided with a series of squared notches 99 for receiving the squared ends 100 of the shafts of the rollers 96 and that a pan 101 is provided with upwardly and outwardly extending flanges 102 whereby the pan may be supported by the racks 93a.

Relatively deep cooking pans 103, a relatively shallow broiling pan 104, relatively shallow cook pans 105 having flanges 106 at their upper edges, and a relatively shallow perforated pan 107 having a flange 108 at its upper edges, are also provided as a part of the apparatus.

In FIGURES 16 and 17 there is shown an alternative means for preheating a cooking fluid indicated at 109. The filter table 14 is provided wtih a transversely extending frame member 110 at its forward side to which is hingedly connected, as indicated at 111 a pair of Calrod units each generally indicated at 112 and each connected in conventional manner to a source of electricity and provided with conventional switches (not shown).

Viewed from one side in normal operative position in a cooking pan 103, as shown in FIGURE 16, each unit 112 is composed of a relatively short vertical portion 113 extending upwardly from the hinges 111, a relatively short horizontal portion 114 extending forwardly from the portion 113, a relatively long vertical portion 115 extending downwardly from the forward end of the portion 114, and a relatively long horizontal portion 116 extending forwardly from the lower end of the portion 115 and adapted to lie adjacent the bottom of the pan 103 when the same is supported by the rollers 56 of the transfer racks 50 or 58 on the transfer table 23. When the units 112 are not in use they may be lifted to an out-of-the-way position as shown in dotted lines in FIGURE 16.

In FIGURE 24 a flanged grill 117 is shown and is adapted to be supported on any pair of horizontally aligned racks 93.

In FIGURES 21 to 23 there is shown an insert or divider generally indicated at 118 and which consists of a pair of end walls 119, a pair of side walls 120 and a centrally disposed transversely extending center wall 121, the latter being provided with angular end pieces 122 whereby the same may be welded to the inner faces of the side walls 120. It will be noted that the divider 118 is open at both top and bottom. Cooking fluid is designated at 123.

In FIGURES 18 to 20, inclusive, there is shown a relatively deep cooking pan 124 similar in size and shape to the pan 103 hereinabove referred to and having built-in electrical means for preheating a cooking fluid contained therein. In this case an electrical heating element, indicated in dotted lines at 125 in FIGURE 20 is connected to a male outlet plug 126 in the forward wall of the pan 124 for attachment to any convenient source of electrical energy as, for example, by means of cords 127 (FIGURE 3) to outlets 128.

In FIGURE 29, there is shown an alternative form of transfer table generally indicated at 129 and positioned with respect to the remainder of the apparatus in exactly the same position as the transfer table 23. In this case a rectangular frame 130 encloses therein a multiplicity of circular sockets 131 all interconnected to each other and to the frame 130 by webbing 132 and each supporting therein a freely movable ball 133.

In FIGURE 28, there is shown an alternative form of the apparatus wherein, instead of a single preheating table 30 as shown, for example, in FIGURES 1 and 2, there is shown a battery of such preheating tables aligned in side-to-side relationship and each being fully self-contained and independently operable.

In FIGURES 30 to 32, inclusive, there is shown a further modification of the apparatus wherein, in addition to the oven table 10, filter table 15, and warming table 18 with their attendant apparatus, the remainder of the apparatus is composed of a combined warming and transfer table generally indicated at 134 and which consists of a generally rectangular housing 135 having access doors 136 and provided with supporting legs 137 having adjustable feet 138. A table top 139 is affixed to the upper end of a hollow shaft 140.

A plurality of preheating tables 30, in this case three in number, is mounted radially in circumferentially spaced relation upon the table top 139 and the shaft 40 of each table 30 is extended at one of its ends to connect with, integrally or otherwise, the drive shaft 141 of a reversible electric motor 142. Each of the motors 142 is provided with lead wires 143 which connect with control panels 144 each of which has an electrical supply cable 145 extending therefrom to join a common supply cable 146 which extends downwardly through a housing 147 centrally disposed upon the table top 139 and thence through the hollow shaft 140, terminating in a connector plug 148 for attachment to a suitable source of electrical energy.

Within the housing 135 there is provided an electric motor 149 for intermittently partially rotating the table top 139 by means of any suitable mechanism such as the Geneva wheel mechanism generally indicated at 150 in FIGURE 32.

In operation, in utilizing the apparatus shown, for example, in FIGURES 1 to 4, inclusive, a cooking pan 103 may be placed between the walls 38 and upon the chains 43 of the preheating table 30 whereupon flames emanating from the burner 38 will act to preheat the cooking fluid contained in the pan 103. When a predetermined heat has been reached, the meat, for example, chicken pieces, may be placed in the cooking fluid in the pan 103 whereupon a rack 50 may be moved longitudinally along the transfer table 23 until it comes into alignment with the chains 43 and the oven door 87. The pan 103 may now be transferred over the rollers 56 by means of the hand crank 44 or causing the motor 45 through its attendant mechanisms to move the chains 43 and hence transfer the pan to the rollers 56 and thence into the oven opening 87 onto the rollers 94. Thereafter the door 88 may be closed by means of the handle 89 thus enclosing the pan 103 and its contents 103 within the oven 11. At this time steam may be introduced under pressure through the steam inlet nozzle 95 into the oven 11, the pressure control switch 96 acting to regulate the exact pressure wanted within the oven 11.

When the meat in the pan 103 has thus been cooked under pressure for a proper length of time, the door 88 may again be opened by means of the handle 89 and manually moved outwardly therefrom to rest upon the rollers 56 of a rack 50 whereupon the latter may be moved to the left, as viewed in FIGURE 1, to a position adjacent the warming table 18. The pan 103 may now be moved to a position upon the drain 63 immediately below the infrared lamp 65a whereby the contents of the pan may be maintained in a heated condition thereby until ready for serving. During the removal of the contents of the pan 103 for serving, cooking fluid such as grease, oil or the like which may drip from the pan will be caught by the top 19 and will move by gravity to the drain opening 20 and thence into the pipe 59 from whence it may be discharged from time to time by opening the valve 60 by means of the operating handle 62 into a pail or the like (not shown) which may be placed beneath the pipe 59 for such purpose.

When meat has thus been removed from the cooking pan 103, the cooking fluid remaining therein may be transferred therefrom to the filter 15. This is done by pivoting the screened suction pipe 72 upon its coupling 71 to a downward position within the cooking pan 103 whereupon the motor 67 may be started by the switch 73 to operate the pump 69 to thus force the cooking fluid through the pipes 70, 75 and 76 to discharge into the tank 81 forming a part of the filter 15.

The thus emptied cooking pan 103 may now be placed upon a rack 50 or 58, as the case may be, in a position adjacent the filter table 14 and filtered cooking fluid from the filter 15 deposited therein by moving the articulated discharge pipe 85 (see FIG. 15) to a position within the pan 103 whereupon the motor 78 may be actuated to cause the pump 83 to move filtered fluid from the bottom of the filter 15 through the pipes 84 and 85 to discharge into the pan 103. This pan may then be placed again upon the chains 43 to allow the process to be repeated.

It will be apparent that instead of a rack 50 adapted to hold only one pan 103 at a time, the rack 58, capable of holding two such pans may be utilized upon the transfer table 23.

Again, the preheating table 30 and its attendant mechanisms may be dispensed with by the use of the apparatus shown, for example in FIGURE 16 wherein, when it is desired to preheat the cooking fluid 109 in the pan 103, the Calrod unit 112 may be moved from its dotted line position shown therein to the full line position and current supplied thereto to preheat the cooking fluid 109 to the desired temperature. As shown in FIGURE 17, a plurality of such Calrod units 112 may be utilized in conjunction with a rack 58 to preheat the fluid contained in one or more cooking pans 103.

Another means for preheating a cooking fluid is shown in FIGURES 18 to 20, inclusive, wherein the pan 124 is provided with a built-in heating element 125 and provided with a connector 126 for connection by a cord 127 to an outlet 128. In this case the fluid in the pan 124 may be brought to a particular temperature prior to admission into the oven in the manner above described.

Referring now to FIGURE 28, it will be seen that there is therein shown a battery of preheating tables 30. With the use of such a battery of preheating tables, it is possible to continuously supply a greater number of pans to the oven 11 by means of the racks 50 so that a greater number of patrons of a particular restaurant may be supplied by the apparatus.

Now, referring to FIGURE 29, there is shown therein a different form of transfer table which permits the elimination of the racks 50 or 58. In this form of the invention pans may be supported upon the balls 133 and moved at will along the table 129 from place to place and, if desired, turned from one position to another while still remaining upon the table.

In the form of the invention illustrated in FIGURES 30 to 32, inclusive, it will be seen that the oven 11, warming table 18 and filter 15 still remain as a part of the apparatus but that an intermittently moving table 134 having a plurality of preheating units 130 mounted thereon is supplied as a part of the apparatus. Here it will be seen that the Geneva wheel apparatus 150 is adapted to intermittently move the table 134 one-third of a revolution. Hence, an operator may place pans 103 upon the preheating units 30 so that such pans may be preheated as they move along with the table whereupon they may be successively moved into and out of the oven 11 and eventually transferred to the warming table 18. It will be seen that the motors 142, being reversible, are adapted to move the pans into and out of the oven 11, it being necessary, of course, to provide some little manual assistance in moving the pans from the oven to the chains of the units 30. It will also be apparent that when a pan is removed from the oven 11, it may be maintained at a particular temperature as it travels about the table by means of the preheating unit 30 upon which it may lie until removed and placed upon the warming table 18.

Referring now to FIGURE 8, it will be seen that the rollers 94 mounted within the oven are adapted to support thereon a cooking pan 103 or 124 as the case may be for normal operation of the apparatus. When, however, it is desired to put the oven to use for other matters, it will be seen by reference to FIGURE 9 that the racks 93 are adapted to support thereon a plurality of cook pans 105 of relatively shallow construction and a perforated pan 107. Alternatively, a broiling pan 104 may be placed at any selected distance from the heating element 90 in the oven 11 as shown, for example, in FIGURE 11 whereupon meat placed in the pan 104 may be broiled by the heating element 90, the steam being meantime, of course, not in use.

When it is desired to cook only small portions of meat, as for example, pieces of chicken, the divider 118 may be placed in a pan 103 and sufficient cooking fluid placed in the compartments thus formed or, alternatively, cooking fluid may be placed at a given height within the pan 103. Thus small quantities of meat or meat of different kinds may be placed in the compartments of the divider 118, as shown in FIGURES 21 to 23, inclusive, thus making it unnecessary to utilize a full pan of cooking fluid for the cooking of small quantities of meat.

While but certain forms of the invention have been shown and described herein, it will be readily apparent to those skilled in the art that many minor modifications may be made without departing from the spirit of the invention or the scope of the appended claims.

What is claimed is:

1. An apparatus of the character set forth comprising an oven having a door in the front wall thereof, a cooking fluid filter positioned at one side of said oven, a warming table positioned at the other side of said oven, an elongated transfer table having one of its sides contiguous to the front of said oven, filter and warming table, a preheating table positioned opposite to the front of said oven and contiguous to the other side of said transfer table having means for heating pans on the preheating table, means for movably supporting pans from one position to another on said transfer table, and means for supporting and moving pans from said preheating table to the supporting and transfer means on said transfer table, means for conveying cooking fluid from pans positioned on said warming table to said filter, and means for conveying cooking fluid from said filter to pans positioned on said transfer table.

2. An apparatus as defined in claim 1 wherein said movably supporting means on said transfer table comprises a guide rail at each longitudinal side of said transfer table, an inwardly directed stop member at each end of each guide rail, and a rack longitudinally movable on said transfer table.

3. An apparatus as defined in claim 2 wherein said rack has dependent legs, a support wheel mounted on the lower end of each leg adjacent to and with its axis perpendicular to a guide rail, and a plurality of rollers mounted in the upper face of said rack, said rollers having their axis parallel to the longitudinal sides of said transfer table.

4. An apparatus as defined in claim 1 wherein said means for supporting and moving pans from said preheating table to the movably supporting means on said transfer table comprises a pair of spaced upright walls on said preheating table, said walls extending perpendicularly with reference to the longitudinal axis of said transfer table, a pair of pan-supporting spaced endless chains mounted between said walls and means in said preheating table for moving said chains.

5. An apparatus as defined in claim 1 wherein said warming table has a top having means defining a drain opening therein, said top sloping toward said drain opening, and a valved drain pipe dependent from said opening.

6. An apparatus as defined in claim 1 further including a bracket affixed to said oven and extending over said warming table, and a heat lamp carried by said bracket and directed toward the top of said warming table.

7. An apparatus as defined in claim 1 wherein said means for conveying cooking fluid from pans positioned on said warming table to said filter comprises an articulated pipe line mounted on said oven and extending from a position over said warming table to a position over said filter and a motor-operated pump in said pipe line.

8. An apparatus as defined in claim 1 wherein said means for conveying cooking fluid from said filter to pans positioned on said transfer table comprises a motor-operated pump mounted on said filter, an inlet pipe interconnecting said pump and said filter, and an articulated pipe extending from said pump.

9. An apparatus as defined in claim 1 wherein said oven is provided with a plurality of transversely extending pan supporting rollers in the lower portion thereof, and a plurality of vertically spaced racks in the sides thereof for supporting a plurality of shallow pans, and means for providing steam under pressure in said oven.

References Cited by the Examiner

UNITED STATES PATENTS

| | | | |
|---|---|---|---|
| 734,685 | 7/03 | Elwell | 193—35 |
| 1,458,021 | 6/26 | Bamford. | |
| 2,076,479 | 4/37 | O'Connell. | |
| 2,529,253 | 11/50 | Hoffman et al. | 99—352 |
| 2,610,740 | 9/52 | Hunter | 99—408 |
| 2,778,736 | 1/57 | Wagner | 99—403 |
| 2,867,165 | 1/59 | Money | 99—446 |
| 3,016,816 | 1/62 | Persinger et al. | 99—339 |
| 3,077,530 | 2/63 | Chase et al. | 219—38 |
| 3,107,601 | 10/63 | Longmire et al. | 99—403 |

ROBERT E. PULFREY, *Primary Examiner.*

JEROME SCHNALL, LAWRENCE CHARLES,
*Examiners.*